United States Patent
Kojima et al.

(10) Patent No.: US 12,556,727 B2
(45) Date of Patent: Feb. 17, 2026

(54) CONTENT GENERATING DEVICE, CONTENT DISTRIBUTION SYSTEM, CONTENT GENERATING METHOD, AND CONTENT GENERATING PROGRAM

(71) Applicant: DWANGO Co., Ltd., Tokyo (JP)

(72) Inventors: Takashi Kojima, Tokyo (JP); Kazuhiko Kusano, Tokyo (JP); Hajime Kato, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 337 days.

(21) Appl. No.: 17/907,643

(22) PCT Filed: Apr. 27, 2021

(86) PCT No.: PCT/JP2021/016747
§ 371 (c)(1),
(2) Date: Sep. 28, 2022

(87) PCT Pub. No.: WO2021/221046
PCT Pub. Date: Nov. 4, 2021

(65) Prior Publication Data
US 2023/0142432 A1  May 11, 2023

(30) Foreign Application Priority Data
Apr. 30, 2020  (JP) ................. 2020-080551

(51) Int. Cl.
*H04N 19/423*  (2014.01)
*H04N 19/136*  (2014.01)
(Continued)

(52) U.S. Cl.
CPC ......... *H04N 19/423* (2014.11); *H04N 19/136* (2014.11); *H04N 19/184* (2014.11); *H04N 19/85* (2014.11)

(58) Field of Classification Search
CPC .. H04N 19/423; H04N 19/184; H04N 19/136; H04N 19/85
See application file for complete search history.

(56) References Cited

U.S. PATENT DOCUMENTS

| 5,841,904 A | 11/1998 | Sugiura |
| 11,800,185 B2 | 10/2023 | Kojima et al. |

(Continued)

FOREIGN PATENT DOCUMENTS

| CN | 106791927 A | 5/2017 |
| CN | 107945108 A | 4/2018 |

(Continued)

OTHER PUBLICATIONS

Decision of Rejection for Chinese Patent Application No. 201980077647.5 dated Jul. 20, 2023, pp. all.

(Continued)

*Primary Examiner* — Joseph G Ustaris
(74) *Attorney, Agent, or Firm* — Dorsey & Whitney LLP

(57) ABSTRACT

According to one or more embodiments, a content generating device is provided. The content generating device comprises a first generator, a second generator, and a first transmitter. The first generator generates low-bit-rate encoded data that is original data having been encoded to a low-bit-rate. The second generator generates machine-learned model data for generating improved data obtained by improving human perceptually the low-bit-rate encoded data, based on a machine-learned model. The first transmitter transmits the low-bit-rate encoded data and the model data to outside.

20 Claims, 5 Drawing Sheets

(51) Int. Cl.
*H04N 19/184* (2014.01)
*H04N 19/85* (2014.01)

(56) References Cited

U.S. PATENT DOCUMENTS

| | | | | |
|---|---|---|---|---|
| 2007/0113242 | A1* | 5/2007 | Fetkovich | H04N 19/85 |
| | | | | 725/135 |
| 2008/0043853 | A1* | 2/2008 | Kawa | H04N 19/423 |
| | | | | 382/268 |
| 2013/0170746 | A1 | 7/2013 | Zhang et al. | |
| 2018/0139458 | A1 | 5/2018 | Wang et al. | |
| 2018/0302455 | A1* | 10/2018 | Bordoloi | H04N 19/115 |
| 2020/0175362 | A1* | 6/2020 | Zhang | G06N 3/04 |
| 2021/0092493 | A1* | 3/2021 | Codenie | H04H 60/372 |
| 2021/0150243 | A1* | 5/2021 | Wang | G06F 3/0488 |
| 2021/0275908 | A1* | 9/2021 | Amer | G06T 7/215 |
| 2022/0070527 | A1* | 3/2022 | Kojima | G06F 13/00 |

FOREIGN PATENT DOCUMENTS

| | | |
|---|---|---|
| CN | 110754093 A | 2/2020 |
| GB | 2548749 A | 9/2017 |
| JP | H04302272 A | 10/1992 |
| JP | H05191796 A | 7/1993 |
| JP | 2015201819 A | 11/2015 |
| JP | 5956761 B2 | 6/2016 |
| JP | 2016534654 A | 11/2016 |
| JP | 2017049686 A | 3/2017 |
| JP | 2017123649 A | 7/2017 |
| JP | 2017158067 A | 9/2017 |
| JP | 2017195429 A | 10/2017 |
| JP | 2019129328 A | 8/2019 |
| JP | 2020524418 A | 8/2020 |
| WO | 2017164297 A1 | 9/2017 |
| WO | 2019225793 A1 | 11/2019 |
| WO | 2020137050 A1 | 7/2020 |
| WO | 2021221046 A1 | 11/2021 |

OTHER PUBLICATIONS

[English Translation] First Office Action for Chinese Patent Application No. 201980077647.5, dated Dec. 20, 2022, pp. all.
Notice of First Review Opinion for Chinese Patent Application No. 202180014290.3 dated May 18, 2023, pp. all.
International Search Report and Written Opinion for PCT/JP2019/037580, mailed Dec. 24, 2019.
International Search Report and Written Opinion for PCT/JP2021/016747, mailed on Jun. 22, 2021.
Dong, Chao , et al., "Image Super-Resolution Using Deep Convolutional Networks", IEEE Transactions on Pattern Analysis and Machine Intelligence, vol. 38, No. 2,, Jan. 6, 2015, pp. 295-307.

* cited by examiner

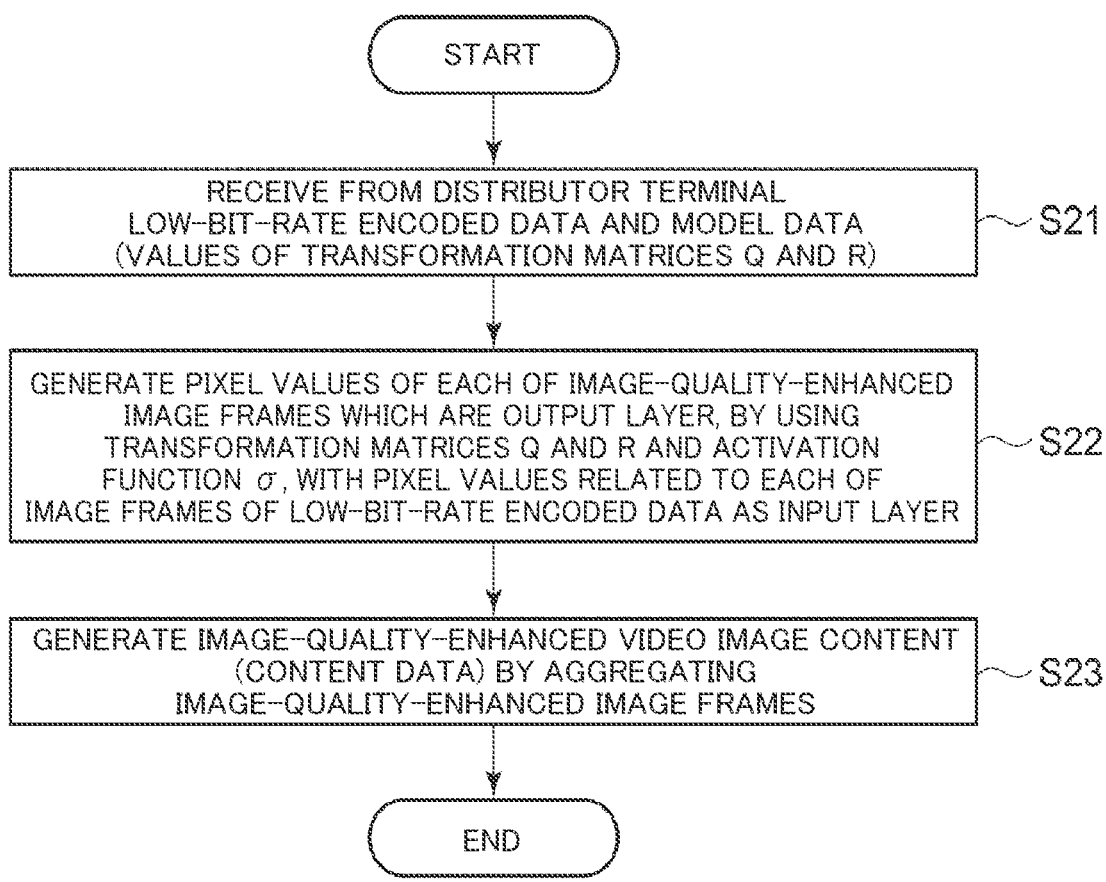

CONTENT GENERATING DEVICE, CONTENT DISTRIBUTION SYSTEM, CONTENT GENERATING METHOD, AND CONTENT GENERATING PROGRAM

CROSS REFERENCE TO RELATED APPLICATION(S)

This application is a U.S. National Stage filing under 35 U.S.C. § 371 of PCT Application No. PCT/JP2021/016747, filed Apr. 27, 2021, which claims priority to Japanese Application No. 2020-080551, filed Apr. 30, 2020, which are incorporated herein by reference, in their entirety, for any purpose.

TECHNICAL FIELD

The present invention relates to a content generating device, a content distribution system, a content generating method, and a content generating program.

BACKGROUND ART

For example, there has traditionally been a content distribution system that transmits image content (hereinafter also referred to as "image broadcast", "broadcast", "content", and these terms may be used hereinbelow) which is a combination of a video image, a still image, and audio as necessary from a distributor terminal to a terminal used by a viewer via a distribution server, so as to enable the viewer to view the image content displayed on a display screen of the terminal of the viewer.

The data volume of image content in recent years tends to be large. This is attributed to an influence of higher resolution and functionality of the cameras for shooting video images and the display devices used on the viewer's side. Accordingly, one of the challenges is to reduce the load on a configuration intervening in a pathway that delivers image content from a distribution source to a distribution destination.

An option to highly efficiently compress a bandwidth for video image content is to reduce the transmission rate (bit rate) for transmitting video image content data so as to transmit the video image content as a small amount of data. This method, however, reduces the amount of data contained in the video image content data, and the quality of images displayed tends to deteriorate, that is, displayed images miss detailed information or contain block noise or mosquito noise, which leads to dissatisfaction of the viewer (user).

For example, an encoder in a system disclosed in Patent Document 1 divides a video stream into a plurality of scenes. Then, for each of the scenes, a scene type is determined and a video stream encoded with video encoding parameters (image encoding parameters) for the scene type is output. Examples of the scene type include "high-speed motion", "still", "talking heads", "text", "credit scroll", "almost black image", and "short scene with five or fewer image frames".

Further, for example, Patent Document 2 below discloses a monitoring system whose storage stores dictionary data for each type of object that can be captured by an imaging unit, in a technique of sharpening an image by super-resolution processing (e.g., paragraph [0013] of Patent Document 2). The dictionary data used in the monitoring system of Patent Document 2 is generated by, for example, learning a combination of high-resolution data and low-resolution data, which are many sets of correct answer data, through a method such as deep learning (for example, paragraph [0029] of Patent Document 2).

CITATION LIST

Patent Documents

Patent Document 1: Japanese Unexamined Patent Publication No. 2017-123649
Patent Document 2: Japanese Unexamined Patent Publication No. 2017-158067

SUMMARY OF THE INVENTION

Technical Problems

The technique disclosed in Patent Document 1 requires that the image encoding parameter be defined for each of the plurality of scene types, and there is a possibility that images that do not fall within any of the scene types assumed in advance may not be effectively encoded.

Further, the technique disclosed in Patent Document 2 is for monitoring images and Patent Document 2 does not disclose a technique taking into account the load on a configuration intervening a communication path and a communication pathway for transmitting image data of a large volume.

That is, the above-referenced patent documents do not at all disclose nor do they suggest a configuration that reduces the load on a communication pathway or the like and distributes video image content with reasonable image quality, in a case of transmitting image data of a large volume such as the video image content from a distribution source to a distribution destination.

The present disclosure is made in view of the above circumstances, and it is an object of the present disclosure to provide a content generating device, a content distribution system, a content generating method, and a content generating program, each of which reduces a load on a configuration intervening in a pathway for transmitting content from a distribution source to a distribution destination and suppresses a drop in the quality of content.

Solution to the Problem

A content generating device according to a first aspect of the present disclosure includes: a first generator configured to generate low-bit-rate encoded data that is original data having been encoded to a low-bit-rate; a second generator capable of generating machine-learned model data for generating improved data obtained by improving human perceptually the low-bit-rate encoded data, based on a machine-learned model; and a first transmitter configured to transmit the low-bit-rate encoded data and the model data to outside.

A content generating device according to a second aspect of the present disclosure is the content generating device of the first aspect further including a recorder configured to store the model data generated in the past, wherein the second generator is capable of transmitting, from the first transmitter to the outside, the model data generated in the past together with the low-bit-rate encoded data.

A content generating device according to a third aspect of the present disclosure is the content generating device of the first or second aspect, wherein the original data is image data and the low-bit-rate encoded data includes meta-information.

A content generating device according to a fourth aspect of the present disclosure is the content generating device of the third aspect, wherein the meta-information of the low-bit-rate encoded data is at least one of: a coding block quantization parameter (QP), a prediction error coefficient, prediction mode information, and motion vector information in an image coding technique.

A content generating device according to a fifth aspect of the present disclosure is the content generating device of the second aspect, wherein the original data includes category information for classifying content according to characteristics thereof, and the recorder records the model data classified based on the category information or an initial value of the model data.

A content distribution system according to a sixth aspect of the present disclosure includes the content generating device of any one of the first to fifth aspect; and a content distribution device including a receiver configured to receive the low-bit-rate encoded data and the model data transmitted from the content generating device, a third generator configured to generate the improved data based on the low-bit-rate encoded data, from the low-bit-rate encoded data and the model data received, and a distributor configured to distribute the improved data.

A content generating method according to a seventh aspect of the present disclosure incudes: a first generating step of generating low-bit-rate encoded data that is original data having been encoded to a low-bit-rate; a second generating step of generating machine-learned model data for generating improved data obtained by improving human perceptually the low-bit-rate encoded data, based on a machine-learned model; and a first transmitting step of transmitting the low-bit-rate encoded data and the model data to outside.

A content generating device according to an eighth aspect of the present disclosure is the content generating method of the seventh aspect including a receiving step of receiving the low-bit-rate encoded data and the model data; and a third generating step of generating the improved data based on the low-bit-rate encoded data, from the low-bit-rate encoded data and the model data received.

A content generating program according to a ninth aspect of the present disclosure causes a computer to execute the content generating method according to the seventh or eighth aspect.

Advantages of the Invention

The present disclosure makes it possible to provide a content generating device, a content distribution system, a content generating method, and a content generating program, each of which reduces a load on a configuration intervening in a pathway for transmitting content from a distribution source to a distribution destination and suppress a drop in the quality of content.

BRIEF DESCRIPTION OF THE DRAWINGS

FIG. 8 is a flowchart explaining an exemplary content generating method according to the embodiment.

DESCRIPTION OF EMBODIMENT

Figure 1:
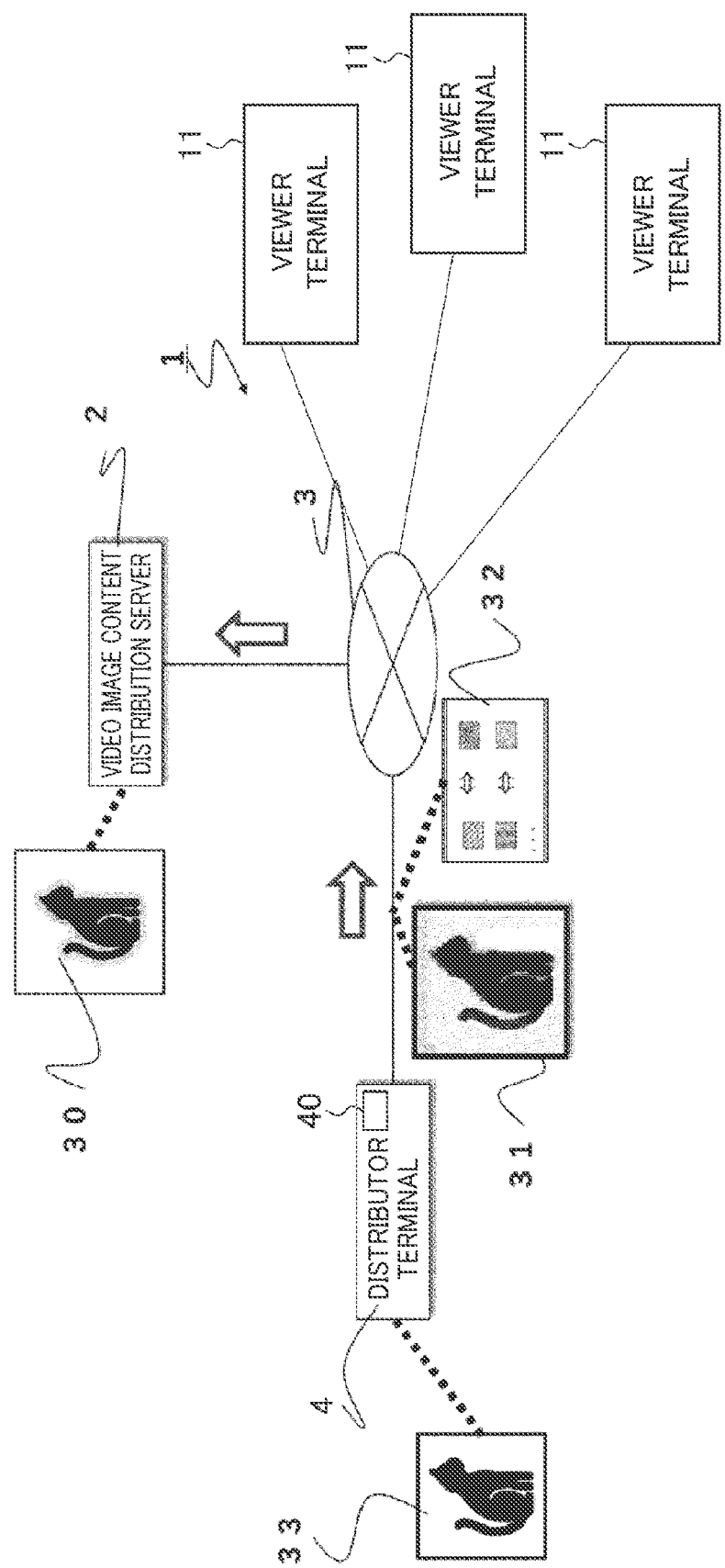
FIG. 1 is a diagram schematically illustrating an exemplary configuration of a content distribution system according to an embodiment.

With reference to the drawings, the following describes in detail a content generating device, a content distribution system, a content generating method, and a content generating program according to an embodiment. Note that, in the following description, a plurality of configurations identical to one another or partially different from one another are given the same reference characters, and explanation for such configurations may not be repeated.

FIG. 1 is a diagram schematically illustrating an exemplary configuration of a content distribution system according to an embodiment. The content distribution system 1 according to the present embodiment includes a content distribution server 2 and a distributor terminal 4.

The distributor terminal 4 is capable of connecting to and communicating with the content distribution server 2 via a network 3 such as the Internet. The content distribution server 2 is capable of connecting to and communicating with a plurality of viewer terminals 11 via the network 3.

Examples of the distributor terminal 4 include, but not limited to, an electronic device such as a computer connectable to a video source such as a video camera; e.g., a television set (including an internet TV), a personal computer (PC), a mobile terminal (e.g., a tablet computer, a smartphone, a laptop computer, a future phone, a portable gaming terminal, a digital music player, an electronic book reader, and the like), a virtual reality (VR) terminal, and an augmented reality (AR) terminal. For example, the distributor terminal 4 includes at least one processor, a storage storing a program executable by the processor, and is capable of achieving various functions by software or a combination of software and hardware.

The distributor terminal 4 may include a content generating device 40. The content generating device 40 may be incorporated into the distributor terminal 4, an external configuration connectable to the distributor terminal 4, or an electronic device such as a computer capable of being connected to and communicating with the distributor terminal 4.

The content generating device 40 is capable of generating low-bit-rate encoded data 31 by using original data 33 and low-bit-rate encoding that original data 33. The content generating device 40 is also capable of generating, from the low-bit-rate encoded data 31, machine-learned model data 32 for generating content data (improved data) 30 which is closer to the original data 33 (or human perceptually improved).

The content generating device 40 can transmit the low-bit-rate encoded data 31 and the model data 32 generated to the content distribution server via an I/O interface (FIG. 2) of the distributor terminal 4 and the network 3.

FIG. 1 shows an example adopting image data of a cat as the original data 33, the low-bit-rate encoded data 31, and the content data 30. The original data 33 may be still image data, video image data, or non-image data (e.g., audio data, text data, or data that is a combination of these types of data).

For example, the content distribution server 2 is a content distribution device including at least one processor, a memory storing a program executable by the processor, and is capable of achieving various functions by software or a combination of software and hardware.

The content distribution server 2 can generate content data 30 by using the low-bit-rate encoded data 31 and the model data 32 received from the distributor terminal 4.

The content distribution server 2 selects a destination viewer terminal 11 according to a distribution request received, and distributes the content data 30 to the selected viewer terminal 11 that is the distribution destination.

Examples of the viewer terminal 11 include, but not limited to, an electronic device such as a computer; e.g., a television set (including an internet TV), a personal computer (PC), a mobile terminal (e.g., a tablet computer, a smartphone, a laptop computer, a future phone, a portable gaming terminal, a digital music player, an electronic book reader, and the like), a virtual reality (VR) terminal, an augmented reality (AR) terminal, and the like.

For example, the viewer terminal 11 includes at least one processor, a memory storing a program executable by the processor, and is capable of achieving various functions by software or a combination of software and hardware.

The viewer terminal 11 can receive the content data 30 from the content distribution server 2, and present the content by using a display unit or an acoustic unit for the viewer to view.

Figure 2:
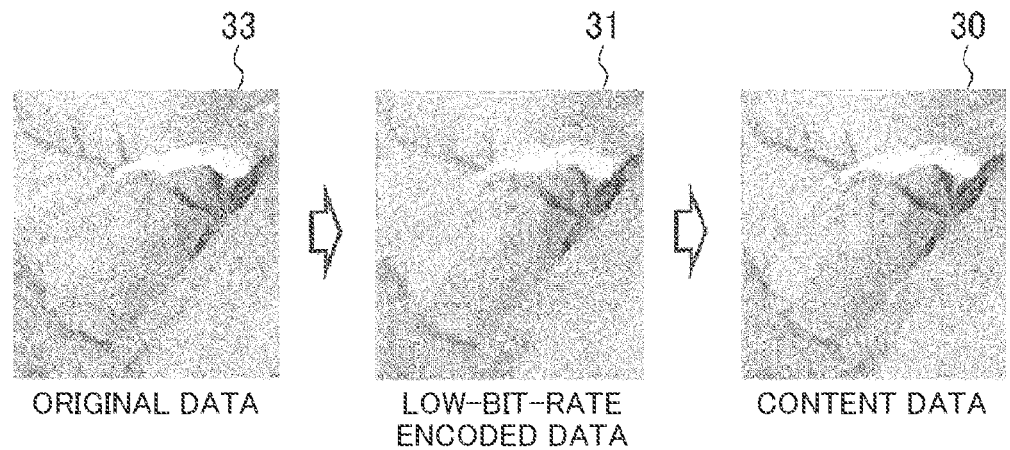
FIG. 2 is a diagram illustrating exemplary original data, low-bit-rate encoded data, and content data used in the content distribution system according to the embodiment.

FIG. 2 is a diagram illustrating exemplary original data, low-bit-rate encoded data, and content data used in the content distribution system according to the embodiment.

FIG. 2 illustrates exemplary low-bit-rate encoded data 31 and exemplary content data 30 in a case of using image data as the original data 33.

The low-bit-rate encoded data 31 is obtained by reducing the transmission rate (bit rate) of the original data 33 and compressing the amount of data. When the image based on the original data 33 and the image based on the low-bit-rate encoded data 31 shown in FIG. 2 are compared to each other, the low-bit-rate encoded image lacks detailed information of the image.

The content data 30 is image data having been subjected to image-quality enhancement using the low-bit-rate encoded data 31 and the model data 32. Here, an image with enhanced image quality or an image made visually closer to the original image in this specification is an image that has been improved so that a human feels as if a high bit-rate image was decoded from a low-bit-rate encoded image. The image data with enhanced image quality is not limited to those that are made visually closer to the original image data, and encompasses those that are visually (human perceptually) improved over the low-bit-rate encoded data 31. For example, the content data 30 may be visually improved with a smaller number of pixels than the original image by, for example, adding details of the image missing from the low-bit-rate encoded data 31. That is, an image with enhanced image quality (or visually improved image) or an image made visually closer to the original image is an image with a lower bit rate than the original image and a higher quality image decoded simply by, for example, increasing the number of pixels and yet having reduced deterioration in display quality.

In a case where the original data 33 is data other than image data, the content data 30 is data human perceptually improved by using the low-bit-rate encoded data 31 and the model data 32. Here, improved data in this specification, or data that is made human perceptually closer to the original data refers to data such that a human perceives as if high-bit-rate data was decoded from low-bit-rate encoded data. In other words, the improved data or the data that is made human perceptually closer to the original data has a lower bit rate than the original image or decoded data decoded simply by, for example, increasing the bit rate and yet having reduced deterioration in display quality of reproduced data.

Comparing the image based on the original data 33 with the image based on the content data 30 illustrated in FIG. 2, the image based on the content data 30 gives an impression of being visually closer to the original image (or visually better) than the low-bit-rate encoded image.

To enhance (improve) the image quality of the low-bit-rate encoded data 31 of video image content, the process may include not only an image-quality enhancement process in the spatial direction of a still image, but also an image-quality enhancement process in the temporal direction of a video image.

Figure 3:
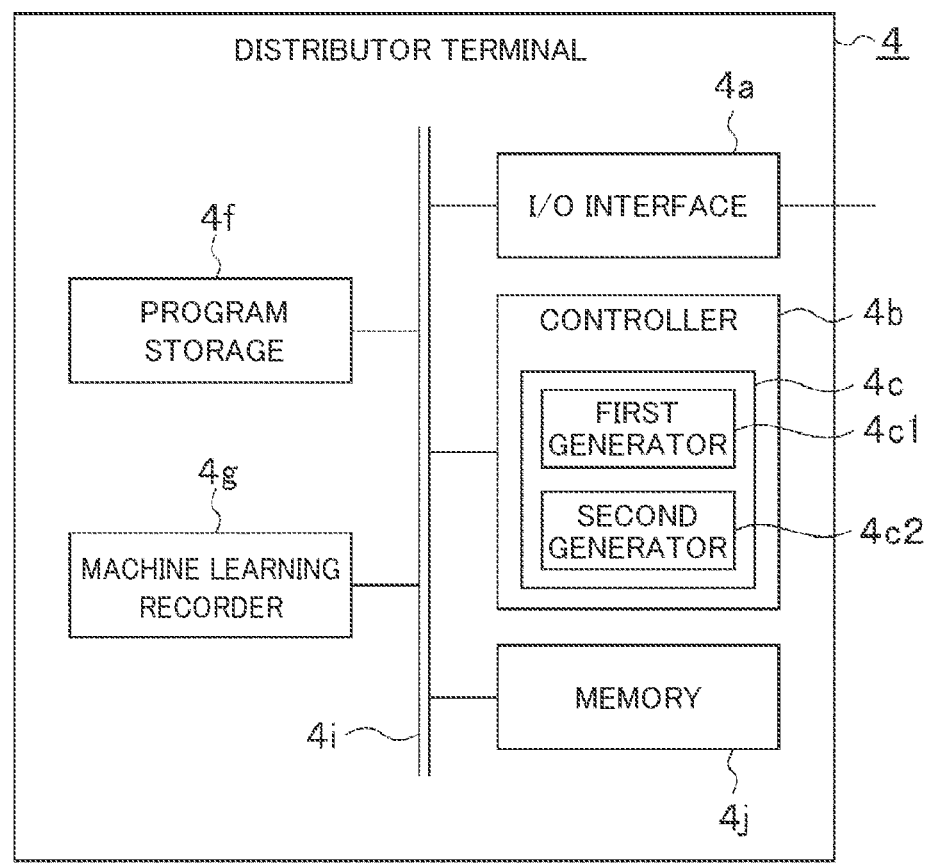
FIG. 3 is a diagram schematically showing an exemplary configuration of a distributor terminal of the content distribution system shown in FIG. 1.

FIG. 3 is a diagram schematically showing an exemplary configuration of a distributor terminal of the content distribution system shown in FIG. 1.

The distributor terminal 4 includes: an I/O interface (first transmitter) 4a, a controller 4b, a learning unit 4c, a memory 4j, a program storage 4f, a machine learning recorder 4g, and a bus line 4i. Note that the content generating device 40 is incorporated into the distributor terminal 4 in the example shown in FIG. 3. The content generating device 40 at least includes a learning unit 4c and a machine learning recorder 4g, and shares with other functions configurations of the distributor terminal 4 except for the learning unit 4c and the machine learning recorder 4g.

The I/O interface 4a provides data connection between a configuration of the distributor terminal 4 and an external configuration.

The bus line 4i connects a plurality of configurations in the distributor terminal 4 with one another so that the configurations are in communication with one another.

The memory 4j contains, for example, a semiconductor storage device such as a RAM or DRAM that allows the controller 4b to write and read data thereto or therefrom. The memory 4j can be used as an area for temporarily storing various types of data while the controller 4b operates. The memory 4j may include an external storage device such as an external hard disk connectable to the distributor terminal 4.

The program storage 4f readably stores therein a program executable by a processor of the controller 4b. The program storage 4f may be included, for example, in an external storage device connected to the outside of the distributor terminal 4, and may be a computer-readable storage medium. Further, the program storage 4f may be integrated with the memory 4j.

The machine learning recorder 4g is configured to allow writing and reading of data by the controller 4b and may record, for example, input data and teacher data for machine learning based on a neural network for example, and a learned model (transformation matrices Q and R) generated through the machine learning. The input data used for machine learning can be, for example, original data 33 of various categories of content encoded at a low bit rate (low-bit-rate encoded data 31). The teacher data used for machine learning can be, for example, original data 33 or improved data of the content corresponding to the input data. In the machine learning recorder 4g, the original data 33, the low-bit-rate encoded data 31 of the original data 33, and the improved data are recorded in association with each other.

Note that, in the present embodiment, the original data 33 (or improved data) and the low-bit-rate encoded data 31 that may be used in machine learning are data externally supplied via the I/O interface 4a or data generated by a function of the distributor terminal 4.

The controller 4b is an arithmetic unit including at least one processor such as a central processing unit (CPU) and includes the learning unit 4c. The controller 4b is capable of controlling operations of a plurality of configurations in the distributor terminal 4. The controller 4b is able to achieve various functions described below by software, that is, by reading out and executing a program stored in the program storage 4f.

Using the input data and the teacher data, the learning unit 4c is able to generate model data 32 based on a learned model generated through deep learning by, for example, a neural network or the like.

The learning unit 4c includes a first generator 4c1 and a second generator 4c2.

The first generator 4c1 is capable of receiving the original data 33 that is externally supplied via the I/O interface 4a for example, and generating low-bit-rate encoded data 31 obtained by encoding the original data 33 received to a low-bit-rate.

The second generator 4c2 can generate a machine-learned model as described hereinbelow, using the low-bit-rate encoded data 31 supplied from the first generator 4c1 or supplied from an external source as input data, and the original data 33 or the improved data associated with the low-bit-rate encoded data 31 as teacher data, and generate data of transformation matrices Q and R (model data 32) based on the learned model.

The second generator 4c2 may update the learned model each time the input data and the teacher data are input, and may generate new model data 32 each time, and may use past model data 32 based on the learned model recorded in the machine learning recorder 4g. In a case of using the past model data 32, the second generator 4c2 can periodically update the learned model using the data recorded in the machine learning recorder 4g.

The second generator 4c2 can record the model data 32 that is based on a previously generated learned model, in the machine learning recorder 4g on a category-by-category basis of the input data. When generating the transformation matrices Q and R for new input data (when updating the learned model), the second generator 4c2 may read out past values from the machine learning recorder 4g and use them as the initial values.

Figure 4:
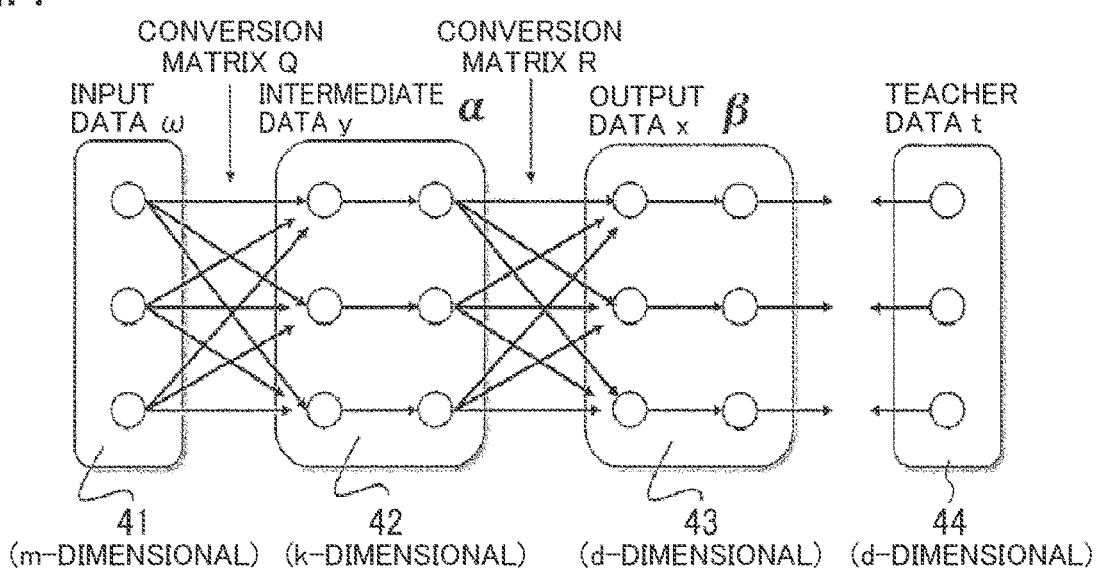
FIG. 4 is an explanatory diagram showing an exemplary concept of deep learning used in the content distribution system according to the embodiment.

The following describes an exemplary method of generating the model data 32 using machine learning. FIG. 4 is an explanatory diagram showing an exemplary concept of deep learning used in the content distribution system according to the embodiment.

The content distribution system 1 according to the present embodiment uses a method of obtaining a most appropriate model using input data and teacher data when obtaining a multidimensional output from a multidimensional input using a neural network in machine learning. It should be noted that the application of machine learning using a neural network described below is no more than an example. The following description deals with a case where the low-bit-rate encoded data 31 and the original data 33 are image data, but these sets of data are not limited to this. It is also possible to generate model data 32 using other machine learning techniques of neural networks, and such configurations are also encompassed within the scope of the present disclosure.

The concept of machine learning shown in FIG. 4 includes an input layer 41, an intermediate layer 42, an output layer 43, and a teacher data layer 44.

As input data ω in neural network technology, the input layer 41 includes m-dimensional data ω of input data parameter 1, input data parameter 2, ... input data parameter m, which are a plurality of parameters (m) of values (luminance, tone) of pixels in a plurality of sample pixels, for example, for a target frame image in image data that is the low-bit-rate encoded data 31.

An input data parameter vector ω related to a low-bit-rate image described above can be expressed by the following equation (1).

[Equation 1]

$$w = \begin{bmatrix} w_1 \\ w_2 \\ \vdots \\ w_m \end{bmatrix} \quad (1)$$

The output layer 43 includes an output data parameter vector x expressed by the following equation (2). The output data parameter vector x is d-dimensional as in the case of a later-described teacher data parameter vector β.

[Equation 2]

$$x = \begin{bmatrix} x_1 \\ x_2 \\ \vdots \\ x_d \end{bmatrix} \quad (2)$$

The intermediate layer 42 includes a k-dimensional vector y (also referred to as "intermediate data") expressed by the following equation (3). The intermediate layer 42 is located between the input layer 41 and the output layer 43.

[Equation 3]

$$y = \begin{bmatrix} y_1 \\ y_2 \\ \vdots \\ y_k \end{bmatrix} \quad (3)$$

The data of the input layer 41 is transformed into the intermediate layer 42 through linear transformation using the transformation matrix Q. The data of the intermediate layer 42 is linearly transformed by using the transformation matrix R and output as data of the output layer 43. Data sets of the layers 41 to 43 are independent and are not connected to one another.

As described above, in the present embodiment, the input data parameter vector ω is not directly converted into the output data parameter vector x, but through two stages of conversion as shown in the following equation (4):

$$y = Q\omega, x = Ry \quad (4).$$

In the above equation (4), Q and R are matrices used for the linear transformation described above. After the linear transformation using each of the transformation matrices Q and R, the transformation is performed for each of the variables using a non-linear function. This function is called an activation function, and the present embodiment uses a logistic sigmoid function σ (a) shown in the following equation (5).

[Equation 4]

$$\sigma(a) = \frac{1}{1+\exp(-a)} \quad (5)$$

Using this logistic sigmoid function σ (a), the transformation of each data set described above can be expressed in four stages as shown in the following equation (6).

[Equation 5]

$$y=Qw, \alpha=\sigma(y), x=R\alpha, \beta=\sigma(x) \quad (6)$$

On the other hand, as teacher data (targeted output data) in neural network technology, the teacher data layer 44 includes d-dimensional data t of teacher data parameter 1, teacher data parameter 2, ... teacher data parameter d, which are a plurality of parameters (d) of values (luminance, tone) of pixels in a plurality of sample pixels, for example, for a target frame image in image data that is the original data 33 or the improved data.

A combination of parameters of the input data ω and the teacher data t described above may be sometimes referred to as parameter vector j in the following description. Additionally, the parameters of the input data ω and the parameters of the teacher data t may overlap partially or entirely.

In learning, the teacher data t (equation (7) below) including pixel values of the original image is given as target output variables.

[Equation 6]

$$t = \begin{bmatrix} t_1 \\ t_2 \\ \vdots \\ t_k \end{bmatrix} \quad (7)$$

Each parameter of the neural network is determined by "estimation" described below so that output values approximate the teacher data t.

A matrix of k rows m columns for transforming the input data parameter vector ω into a variable vector y in the intermediate layer 42 is y=Qω when expressed by Q=[q hj] (where q hj is an element of h rows j columns), and is as shown in the following equation (8) when expressed by elements (parameters).

[Equation 7]

$$\begin{bmatrix} y_1 \\ y_2 \\ \vdots \\ y_k \end{bmatrix} = \begin{bmatrix} q_{11} & q_{12} & \cdots & q_{1m} \\ q_{21} & q_{22} & \cdots & q_{2m} \\ \vdots & \vdots & \ddots & \vdots \\ q_{k1} & q_{k2} & \cdots & q_{km} \end{bmatrix} \begin{bmatrix} w_1 \\ w_2 \\ \vdots \\ w_m \end{bmatrix} \quad (8)$$

Further, the variable vector y transformed according to the above-described equation (8) can be transformed non-linearly using the above-described logistic sigmoid function σ (a) as shown in the following equation (9).

[Equation 8]

$$\alpha_h = \sigma(y_h) = \sigma(q_{h1}w_1 + q_{h2}w_2 + \ldots + q_{hm}w_m) \quad (h = 1, \ldots k) \quad (9)$$

Similarly, a matrix of d rows K columns for transforming a variable vector α obtained from the intermediate layer 42 into a variable vector x in the output layer 43 is x=Rα when expressed by R=[r ih] (where r ih is an element of i rows h columns), and is as shown in the following equation (10) when expressed by elements (parameters).

[Equation 9]

$$\begin{bmatrix} x_1 \\ x_2 \\ \vdots \\ x_d \end{bmatrix} = \begin{bmatrix} r_{11} & r_{12} & \cdots & r_{1k} \\ r_{21} & r_{22} & \cdots & r_{2k} \\ \vdots & \vdots & \ddots & \vdots \\ r_{d1} & r_{d2} & \cdots & r_{dk} \end{bmatrix} \begin{bmatrix} \alpha_1 \\ \alpha_2 \\ \vdots \\ \alpha_k \end{bmatrix} \quad (10)$$

Further, the variable vector x transformed as described above can be transformed non-linearly using the above-described logistic sigmoid function a (a) as shown in the following equation (11).

[Equation 10]

$$\beta_i = \sigma(x_i) = \sigma(r_{i1}\alpha_1 + r_{i2}\alpha_2 + \ldots + r_{ik}\alpha_k) \quad (i = 1, \ldots d) \quad (11)$$

Next, the process of learning, that is, the process of estimating the two transformation matrices Q and R, is described. For this estimation, the present embodiment uses a method called an error back propagation method described below.

Namely, first, an error between the teacher data t which is the parameter of the image data as the original data 33 or the improved data and output (teacher data parameter vector) β is calculated. Using this error, the amount of change in the transformation matrix R between the intermediate layer 42 and the output layer 43 is derived. Next, an amount of change in the transformation matrix Q between the input layer 41 and the intermediate layer 42 is derived.

In estimating the element parameters of each of the above transformation matrices Q and R, estimation to minimize the square sum of the errors is performed. However, since the process includes non-linear transformation, the stochastic gradient descent method is used. This is a method that changes the element parameters of the matrix by an amount proportional to the error gradient so as to reduce the square sum of the errors for each sample of the learning data.

Through each process described above, the second generator 4c2 is able to generate the transformation matrices Q and R for the input data. The second generator 4c2 can transmit the generated model data 32 and the low-bit-rate encoded data 31 that is the input data to the content distribution server 2 via the I/O interface 4a and the network 3.

Figure 5:
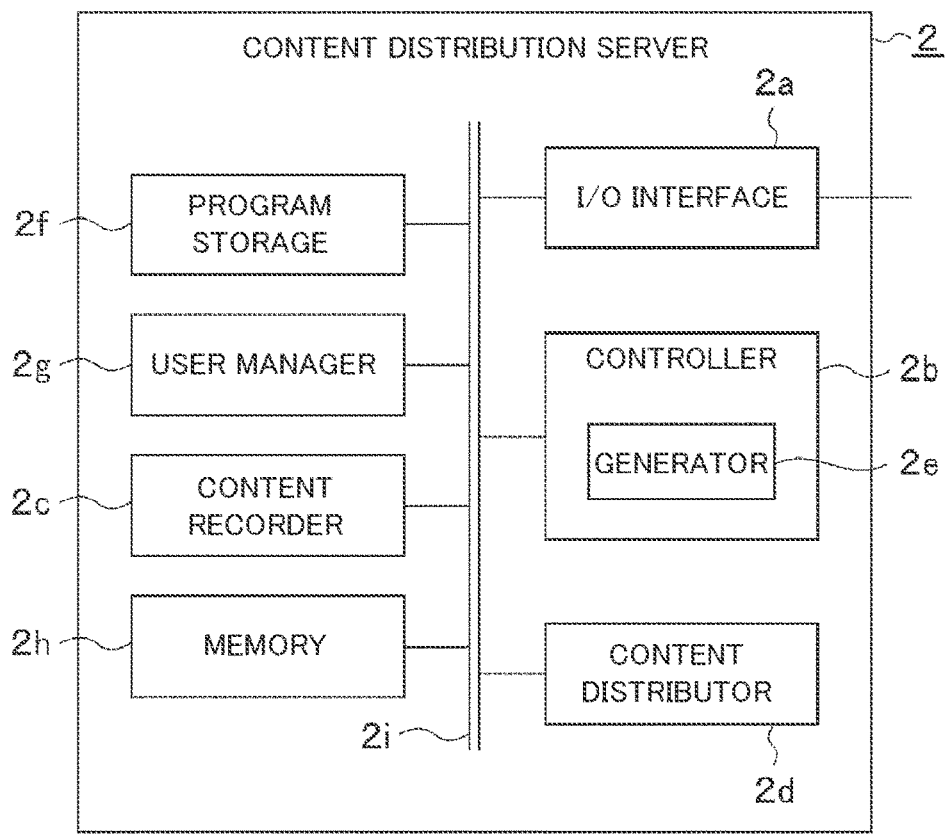
FIG. 5 is a diagram schematically showing an exemplary configuration of a video image content distribution server of the content distribution system shown in FIG. 1.

FIG. 5 is a diagram schematically showing an exemplary configuration of a video image content distribution server of the content distribution system shown in FIG. 1.

The content distribution server 2 is implemented by a server computer and the like and includes I/O interface 2a, a controller 2b, a program storage 2f, a user manager 2g, a content recorder 2c, a content distributor 2d, a memory 2h, a bus line 2i.

The I/O interface 2a inputs and outputs information to or from the content distribution server 2 from or to the outside.

The bus line 2i connects a plurality of configurations in the content distribution server 2 in such a manner as to enable communications with one another.

The user manager 2g records and manages information related to the viewer or the viewer terminal 11, such as whether the viewer terminal 11 having transmitted a content distribution request is a member of a video distribution site, for example. The user manager 2g includes, for example, a table storing information of the viewer or the viewer terminal 11.

The content recorder 2c stores the video image content to be distributed. The content handled by the content distribution server 2 is not limited to the video image content, and may be content of other specifications such as still image content and audio content, or a combination of these various types of content. In addition, the content recorder 2c can record, for example, a "comment" that is a text data posted by a viewer for each set of content, together with a reproduction time (information of a time measured from the beginning of the content) at which the comment was posted.

The memory 2h contains, for example, a semiconductor storage device such as a RAM or DRAM that allows the controller 2b to write and read data thereto or therefrom. The memory 2h can be used as an area for temporarily storing various types of data while the controller 2b operates. The memory 4j may include an external storage device such as an external hard disk connectable to the content distribution server 2.

The program storage 2f readably stores therein a program executable by a processor of the controller 2b. The program storage 2f may be included, for example, in an external storage device connected to the outside of the content distribution server 2, and may be a computer-readable storage medium. Further, the program storage 2f may be integrated with the memory 2h.

The controller 2b is an arithmetic unit including at least one processor such as a CPU (Central Processing Unit), and is capable of controlling operations of the plurality of configurations included in the content distribution server 2. The controller 2b is able to achieve various functions described below by software, that is, by reading out and executing a program stored in the program storage 2f.

The controller 2b includes a generator (third generator) 2e.

The generator 2e can receive the low-bit-rate encoded data 31 and the model data 32 supplied from the distributor terminal 4, transform each parameter of the low bit rate image that is the low-bit-rate encoded data 31 (each parameter may be a pixel value representing the luminance or the color tone, each parameter in image coding technique, or other parameters) according to the aforementioned equation (6), and obtain an output data vector x, thereby calculating parameters for drawing an image-quality enhanced image corresponding to the content data 30 (parameters for reproducing the improved data). The generator 2e generates image-quality-enhanced image frames by using the calculated parameters, generates content data 30 of the image-quality-enhanced (improved) video image, and records the content data 30 in the content recorder 2c.

Figure 6:
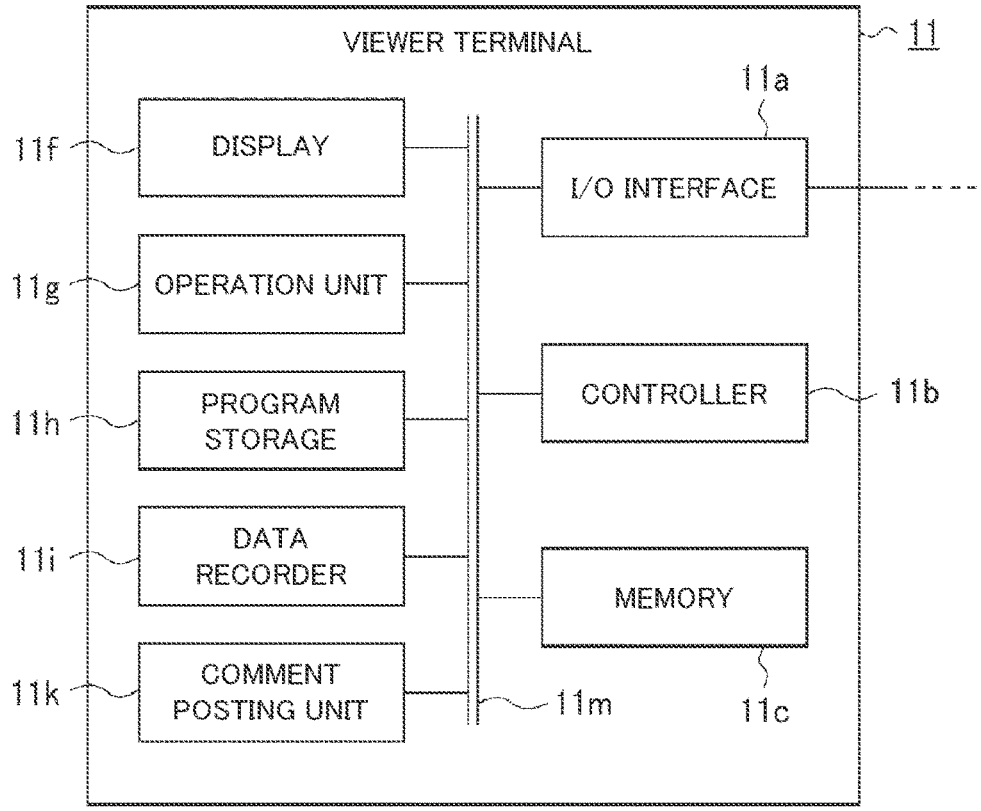
FIG. 6 is a diagram schematically showing an exemplary configuration of a viewer terminal of the content distribution system shown in FIG. 1.

FIG. 6 is a diagram schematically showing an exemplary configuration of a viewer terminal of the content distribution system shown in FIG. 1.

The viewer terminal 11 includes an I/O interface 11a, a controller 11b, a memory 11c, a display 11f, an operation unit 11g, a program storage 11h, a data recorder 11i, a comment posting unit 11k, and a bus line 11m.

The I/O interface 11a provides data connection between a configuration of the viewer terminal 11 and an external configuration.

The bus line 11m connects a plurality of configurations in the viewer terminal 11 with one another so that the configurations are in communication with one another.

The controller 11b is an arithmetic unit including at least one processor such as a central processing unit (CPU). The controller 11b is capable of controlling the operations of the plurality of configurations included in the viewer terminal 11.

The memory 11c contains, for example, a semiconductor storage device such as a RAM or DRAM that allows the controller 11b to write and read data thereto or therefrom. The memory 11c can be used as an area for temporarily storing various types of data while the controller 11b operates. The memory 11c may include an external storage device such as a hard disk connected outside the viewer terminal 11.

The display 11f is capable of displaying what is in the received content, displaying an operation screen for the content, and the like. The display 11f includes, for example, a planar display device such as a liquid crystal display device, an organic El display device, or the like, and includes a driving circuit therefor.

The operation unit 11g is capable of sending, to the controller 11b, commands for the viewer terminal 11, which is attributed to the viewer's operation of a keyboard, a mouse, or the like.

The program storage 11h readably stores therein a program executable by a processor of the controller 11b. The program storage 11h may be included, for example, in an external storage device connected to the outside of the viewer terminal 11, and may be a computer-readable storage medium. Further, the program storage 11h may be integrated with the memory 11c.

The data recorder 11i can record content data 30 based on the low-bit-rate encoded data 31 received from the content distribution server 2 and other content data and the like.

The comment posting unit 11k is a configuration for posting viewer comments to the content distribution server 2. The comment posting unit 1K can transmit, to the content distribution server 2, comment information of the viewer obtained from the operation unit 11g or a not-shown microphone, and the like.

The content distribution system 1 of the present embodiment can achieve efficient compression of transmission bandwidth and restoration of data to quality close to the original data (or to a level that feels the data is human perceptually improved), in a system that performs transmission or reception of content via a transmission path such as the internet communication network with limited bandwidth.

Further, in the content distribution system 1 of the present embodiment, the distributor terminal 4 generates the model data 32 for use in data restoration of the low-bit-rate encoded data 31 based on the learned model resulting from machine learning, and the content distribution server 2 generates the content data 30. Therefore, the viewer terminal 11 can handle the content data (improved data) 30 based on the low bit rate encoded data 31 without distinguishing it from the other content data. Therefore, there is no longer a need for the viewer terminal 11 to have a special function to handle the content data 30, thus reducing the burden on the viewer side.

In the system of the present embodiment, the accuracy of the model data 32 can be improved through machine learning in the distributor terminal 4 (or the content generating device 40). It is likely that a distributor distributing a plurality of sets of content creates similar sets of content likely to be sorted under the same category. Therefore, by performing machine learning for data restoration in the distributor terminal 4 (or content generating device 40), it is possible to generate more efficient and highly accurate model data 32.

The following describes an exemplary content generating method in a content display system according to an embodiment.

Figure 7:
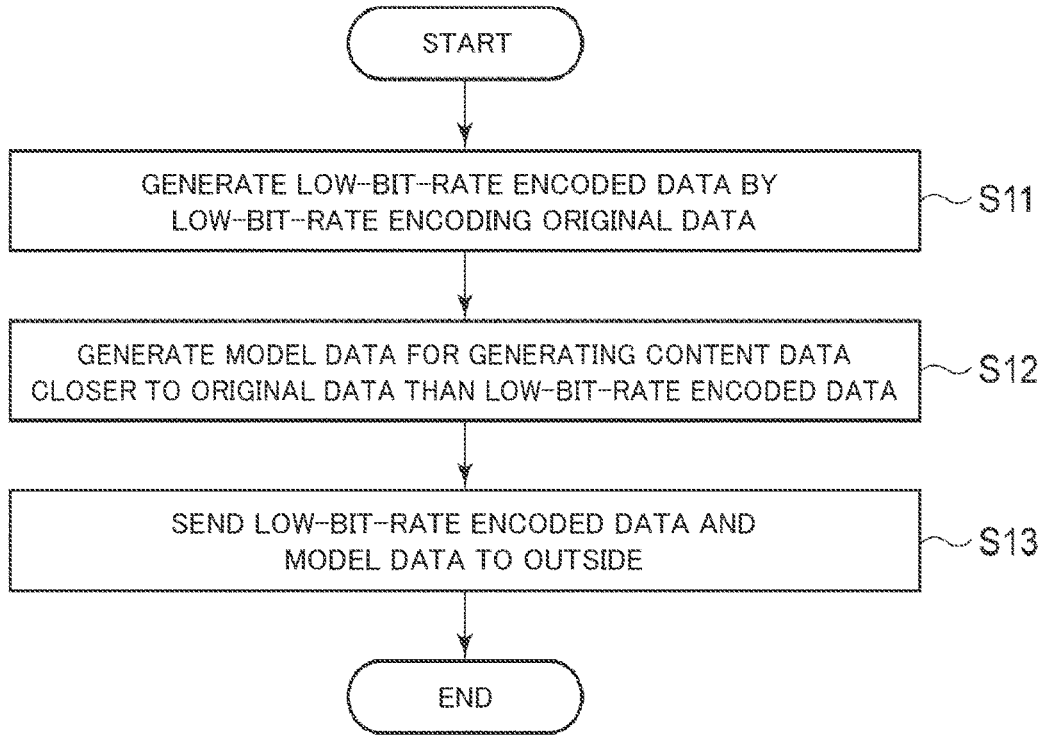
FIG. 7 is a flowchart explaining an exemplary content generating method according to the embodiment.

FIG. 7 and FIG. 8 are each a flowchart explaining an exemplary content generating method according to the embodiment.

The following description assumes the content generating device 40 has performed machine learning in advance using sample data or the like recorded in the machine learning recorder 4g, and model data 32 has been generated based on the learned model generated in advance.

For example, when uploading image data of a particular cat (Mike), the learned model may be generated using the image data of the particular cat (Mike) (original data, improved data, low-bit-rate encoded data) as input data and teacher data. Alternatively, machine learning may be performed in advance by using the image data (original data, improved data, low-bit-rate encoded data) of the particular cat (Mike) and another cat as the input data and the teacher data. Alternatively, machine learning may be performed in advance by using the image data (original data, improved data, low-bit-rate encoded data) of animals in general including cats as the input data and the teacher data. Alternatively, machine learning may be performed in advance by using the image data (original data, improved data, low-bit-rate encoded data) of animals and another entity as the input data and the teacher data.

First, the original data 33 is obtained in the distributor terminal 4, and the original data 33 is encoded to a low bit rate by the first generator 4c1 to generate the low-bit-rate encoded data 31 (step S11). The distributor terminal 4 may receive the original data 33 from the outside, or generate the original data 33 using various functions of the distributor terminal 4.

Next, the second generator 4c2 generates the model data 32 based on the learned model generated through machine learning using the low-bit-rate encoded data 31 as the input data and the original data 33 or the improved data as the teacher data (step S12).

The second generator 4c2 can update the learned model using newly entered low-bit-rate encoded data 31 and the original data 33, and generate the model data 32 based on the updated learned model. Further, the second generator 4c2 can generate the model data 32 based on the past learned model recorded in the machine learning recorder 4g, for example.

At this time, for example, in a case where the original data 33 includes category information (a type of content to be distributed, imaged content, a title, a photographer, a genre, a tag, a combination thereof, or the like), the second generator 4c2 can generate the model data 32 corresponding to the category of the original data 33.

For example, the second generator 4c2 can record the model data 32 on a category-by-category basis of the original data 33 in the machine learning recorder 4g. The second generator 4c2 can select a corresponding one of the plurality of sets of model data 32 recorded in the machine learning recorder 4g as the initial values based on the category information of the original data 33 supplied, and update the learned model using the new input data and the new teacher data. The second generator 4c2 can generate new model data 32 based on the updated learned model, and record the new model data 32 in the machine learning recorder 4g in association with the corresponding category information.

By generating the model data 32 for each category as described above, content data 30 closer to the original data 33 (or feels the data is human perceptually improved) can be generated when the content data 30 is generated using the model data 32. For example, in a case where the content relates to a "cat", the category of content corresponding to "animals" is prepared in advance, and the content belonging to this animal category (the original data 33 or the improved data) can be taken as the teacher data, and data obtained by low-bit-rate encoding the content (the low-bit-rate encoded data 31) can be taken as the input data, and the transformation matrices Q and R estimated through machine learning can be taken as the initial values of the model data 32.

The second generator 4c2 does not need to update the learned model to generate a new model data 32 each time the original data 33 and the low-bit-rate encoded data 31 are input, and can use the model 32 based on the learned model having already been generated (recorded in the machine learning recorder 4g). For example, the model data 32 based on the learned model may be generated in advance using the teacher data of the sample data and the low-bit-rate encoded data of the sample data, in a case where sufficient sample data (input data and teacher data) is available for learning. The second generator 4c2 may accumulate the input original data 33 (or improved data of the original data 33) and the low-bit-rate encoded data 31 as sample data in the machine learning recorder 4g, and update the learned model to generate new model data 32 when the number of new sample data sets (not yet used for machine learning) exceeds a predetermined number. In this case, the second generator 4c2 can use the model data 32 generated in advance in accordance with the category or the like of the original data 33, and can reduce the frequency of performing the machine learning.

In a case of preparing a plurality of sets of model data 32 or initial values of the model data 32 corresponding to a plurality of content categories, the model data 32 corresponding to the category of content often created by the distributor may be prepared. Therefore, generating the model data 32 does not impose a high load on the distributor terminal 4.

Next, the second generator 4c2 outputs the low-bit-rate encoded data 31 and the model data 32 to the outside via the I/O interface 4a (step S13). The content distribution server 2 receives the low-bit-rate encoded data 31 and the model data 32 from the distributor terminal 4 via the network 3 (step S21).

For example, the generator 2e of the content distribution server 2 uses, for example, the parameter values of the low-bit-rate encoded data 31 as the parameter values of the input layer, and generates the parameter values of the output layer by using the model data (e.g., transformation matrices Q and R) 32 and the activation function G. For example, when generating video image content data, the generator 2e uses the pixel values (luminance, tone, and the like) of the low-bit-rate encoded data 31 for each image frame as the parameter values of the input layer, and generates pixel values (luminance, tone, and the like) of the image-qualityenhanced image frames by using the model data (e.g., transformation matrices Q and R) 32 and the activation function a (step S22).

The generator 2e generates the content data 30 based on the generated parameter values of the output layer. For example, when generating video image content data, the generator 2e aggregates each image-quality-enhanced image frame and generates image-quality enhanced video image content (step S23).

In the content generating method described above, each of the following items is closely related to what is in each set of content, and the characteristic of the content can be aptly classified. It is also effective to have the distributor terminal 4 automatically classify and prepare the model data according to these items, and distribute the model data 32 along with the low-bit-rate encoded data 31 of the content.

To that end, the second generator 4c2 of the distributor terminal 4 described above may have a configuration for selecting the model data 32 or the initial value of the model data 32 most suitable for the original data 33, from among the plurality of pieces of model data 32 prepared in advance in accordance with the characteristic (category) of the content. For example, in an operation of making selection, if the following items are included in the content to be distributed, the model data suitable for the image-quality enhancement process (improvement process) may be automatically selected from these items.

Comment information posted by a viewer having viewed the content

Explanatory text information explaining the content

Information about the author of the content

Information about the name of the content or the name of the series

Information about the distributor who distributes the content

Another item that is closely related to what is in the content as described above is "tag" information. The "tag" herein is a search keyword associated with each set of content and indicates what is in the content. For a single set of content, a predetermined number (e.g., ten) tags can be registered. The tag makes a system such that, for example, a viewer is able to easily find a video image he or she wishes or find a video image resembling one particular video image.

The tag can be freely registered not only by a moving image posting person who posts the content to the content distribution server 2, but also by a viewer (also referred to as a browsing user) who views the content. Although tags are originally used for searching purposes, there are many cases of tagging in relation to what is in the content or tagging specific to the distribution site. The reality of its use is that it may serve to show viewers what to look for in a video image of the content rather than to classify the content for searching purposes, and in some cases, tags are used for communications among viewers. Tags that are voluntarily invented by viewers for video content that deals with the same material (a myriad of subgenres belonging to popular genres, such as "I sang" and "Idle Master", for example) and video content by the same author are also an aspect that meets the needs of searching to the depth.

The applicant runs a video image distribution website "Niko Niko Douga" https://WWW.nicovideo.jp/video_top?ref=nicotop_vide.

The following are examples of tags actually used on this "Nico Nico Douga" site. In the "category" (also referred to as "category tag") that is a superordinate classification of tags, "Entertainment music" includes, for example, "VOICEROID Theater", "Original Song", "Virtual YouTuber", "Idol Club", "Nijisanji", "Animation Song Full Version", "Work BGM", "Fate MMD", "MMD Touken Ranbu", "Nikoslo", "SCP Commentary", "Pachislo", "SCP", "Vocaroid Karaoke DB", "Yukkuri Commentary", "Voice Actor Live", "R.A.B", "Pachinko", "Work BGM without Animation Taste", "Singing Voiceroid", "VOCALOID", "Legendary", "Cosplay Dance", "Nicopachi", "VOCALOID Hall of Fame", "Uchiiku TV", Minecraft Courage Test", "Yukkuri Spooky Stories", "Halo Pro", "Famous Songs Overseas", "Let's Become a Writer", "That song I was looking for", and "Songs Overseas".

Similarly, in the category of "Life in General and Sports", there are, for example, "Japan-U.S. Baseball", "Noricchi", "RTA (Real Mountaineering Attack)", "Yukkuri Commentary", "VOICELOID in-vehicle", "WWE", "Oriental Short-Clawed Otter", "Figure Skating", "Traffic Around the World", "Motorcycle", "Drive Recorder", "Heterophiliac Video Links", "The Failing Company", "Yukkuri Chat", "VOICELOID Commentary", "Professional Baseball", "Murderous Furballs", "The Lost Wilderness", "Boi-Sake-Roid", "The Highball Person", "The World's Eccentricities and Greatness", "Yukkuri Commentary Videos", "Play collection from the active years of baseball alumni", "Shiba Dogs", "Barbecue", "Fighting Trive", "Formula One", "Niko-niko Travel Abroad", "Nukonuko Video", "Unleashing Wilderness", "Outdoor Cooking", "Ramen", "Military", "Home Run Collection", "Road Race", "Nostalgic Commercials", "Dogs", "Seal s", "Toast", "Yukkuri on-board", "Baseball", "Yokohama DeNA BayStars", "Cats", "Screaming Beavers", "Dogs and Cats", and the like.

Similarly, in the category of "Science and Technology", there are, for example, "Powdery Mildew", "Air Crash", "Guns", "Documentary", "Revolver", "Military", "Astonishing Universe", "Spinning-Wheel Series", "Sound of Hydrogen", "Pistols", "Figures", "Strange Weapons", "Fly on Strange Airplanes Series", "Strange Train Derived Series", "Men of Naples", "Plastic models", "Japanese sword", "The Universe", "Shocking footage", "Military Training NGs", "Circumference", "Retro PC", "Mini four-wheel drive", "Nikoniko Weapons Development Bureau", "JAXA", "Subaru", "Nico Nico Fantasy Science Department", "Size Comparison Series", "Black Hole", "Vehicle proximity alert device series", "F-22", "World Traffic Conditions", "Flappers", "Science Whiz", and "Mathematics".

As a result, the following outstanding effects are brought about.

First, since tags are added by the author or a viewer of the content, there is no need for the operator or the administrator of the content distribution system 1 to add the tags. Further, since tags are added by the author or a viewer who is familiar with what is in the content, the tags are added accurately.

Furthermore, unlike the category, the tags are subdivided as described above, and the author or a viewer who knows existing tags add the same tag. Therefore, sets of video image content belonging to the same tag are likely to be extremely close to each other, which enables a highly accurate learning process in the machine learning.

As described hereinabove, the content generating method of the present embodiment can achieve efficient compression of transmission bandwidth and restoration of data to quality close to the original data (or to a level that feels the data is human perceptually improved), in a system that performs transmission or reception of content via a transmission path such as the internet communication network with limited bandwidth.

In the content generating method of the present embodiment, the accuracy of the model data 32 can be improved through machine learning in the distributor terminal 4. It is likely that a distributor distributing a plurality of sets of content creates similar sets of content likely to be sorted under the same category. Therefore, by performing machine learning for data restoration in the distributor terminal 4, it is possible to generate more efficient and highly accurate model data 32.

As described hereinabove, with the present embodiment, it is possible to provide a content generating device, content distribution system, content generating method, and content generating program, each of which reduces a load on a configuration intervening in a pathway for transmitting content from a distribution source to a distribution destination and suppress a drop in the quality of content.

Next, the following describes a content generating device, a content distribution system, a content generating method, and a content generating program of a second embodiment.

The content generating device, the content distribution system, the content generating method, and the content generating program of the present embodiment are the same as those of the first embodiment described above, except for the following points.

Namely, in a case where the original data 33 is image data when model data 32 is generated in the content generating device 40 of the present embodiment, data for use in the machine learning may include at least any of the following items in the image coding technique, the following items being meta-information of low-bit-rate encoded video image content that is to be targeted for image-quality enhancement, instead of or in addition to the values (luminance, tone) of the low-bit-rate encoded image frames and the pixels of the original image described above.

Coding block quantization parameters
Prediction error coefficient
Prediction mode information
Motion vector information Note that the aforementioned items of the low-bit-rate encoded data 31 can be included in the low-bit-rate encoded data 31 when the first generator 4c1 generates the low-bit-rate encoded data 31 from the original data 33.

It is expected that the accuracy of estimation in the machine learning is expected to further improve by using meta-information, which is at least one of the above items, in the machine learning. That is, with the present embodiment, it is possible to provide a content generating device, content distribution system, content generating method, and content generating program, each of which reduces a load on a configuration intervening in a pathway for transmitting content from a distribution source to a distribution destination and suppress a drop in the quality of content, as in the above-described first embodiment.

While the aforementioned embodiments primarily deal with a case of distributing video image content, the present disclosure can be implemented for various data types, such as still images, audio data, and the like, and not limited to the video image content.

For example, a transmission and reception system may be such that: a distributor terminal 4 serving as a transmission device includes a learning unit 4c that generates, from low-bit-rate encoded data obtained by low-bit-rate encoding original data, model data for generating improved data that is closer to the original data (or feels as if improved human perceptually) through machine learning, and a transmitter (I/O interface) 4a configured to transmit the low-bit-rate encoded data and the model data to the outside the device; and the content distribution server 2 serving as a receiver device includes a generator 2e configured to generate content data 30 that is improved data of the low-bit-rate encoded data, from the low-bit-rate encoded data and the model data received.

Meanwhile, the configurations included in each of the embodiments of the content distribution system 1 described above may include configurations adapted to other data formats or generic data formats, instead of targeting video image content.

In the transmission of these various types of data, reduction of the load on the transmission pathway is required, whereas, in reproduction in the receiver terminal, high quality of reproduction is required. These points are the same as the issues in the case of delivering video images, and the effects brought about by implementing the present disclosure are the same as the effects described in the preceding embodiments.

The present disclosure is not limited to the embodiments described above, and may be altered in various ways in implementation, without departing from the scope of the present disclosure. Further, the embodiments may be suitably combined in implementation, in which case a combination of effects will be brought about. Further, the above-described embodiments contain various inventions, and combinations of selected configurations out of a plurality of configuration requirements disclosed yield various inventions. For example, even if some configuration requirements are removed from all the configuration requirements indicated in the embodiments, if the problem can be solved and an effect is achievable, the configuration without that removed configuration requirement may be extracted as an invention.

DESCRIPTION OF REFERENCE CHARACTERS

1 Content Distribution System
2 Content Distribution Server
2a I/O interface
2b Controller
2c Content Recorder
2d Content Distributor
2e Generator (Third Generator)
2f Program Storage
2g User Manager
3 Network
4 Distributor Terminal
4a I/O Interface (Transmitter)
4b Controller
4c Learning Unit
4c1 First Generator
4c2 Second Generator
4f Program Storage
4g Machine Learning Recorder
11 Viewer Terminal
30 Content Data (Improved Data)
31 Low-Bit-Rate Encoded Data
32 Model Data
33 Original Data
40 Content Generating Device
41 Input Layer
42 Intermediate Layer
43 Output Layer
44 Teacher Data Layer

The invention claimed is:
1. A content generating device, comprising at least one processor configured to:
obtain original data including category information;

encode the original data to a low-bit-rate and generate low-bit-rate encoded data;

generate, based on a machine-learned model, machine-learned model data corresponding to the category information of the original data by using teacher data corresponding to the category information, the machine-learned model data to be used for generating improved data that is human perceptually improved from the low-bit-rate encoded data; and transmit the low-bit-rate encoded data and the model data to outside the device.

2. The content generating device of claim 1, wherein the at least one processor is further configured to:

store the model data generated in the past; and transmit, to the outside of the device, the model data generated in the past together with the low-bit-rate encoded data.

3. The content generating device of claim 2, wherein the original data includes the category information for classifying content according to characteristics thereof, and the at least one processor records the model data classified based on the category information or an initial value of the model data.

4. The content generating device of claim 1, wherein the original data is image data, and the low-bit-rate encoded data includes meta-information.

5. The content generating device of claim 4, wherein the meta-information of the low-bit-rate encoded data is at least one of: a coding block quantization parameter (QP), a prediction error coefficient, prediction mode information, and motion vector information in an image coding technique.

6. A content distribution system, comprising:

a content generating device including at least one processor configured to:

obtain original data including category information;

encode the original data to a low-bit-rate and generate low-bit-rate encoded data;

generate, based on a machine-learned model, machine-learned model data corresponding to the category information of the original data by using teacher data corresponding to the category information, the machine-learned model data to be used for generating improved data that is human perceptually improved from the low-bit-rate encoded data; and transmit the low-bit-rate encoded data and the model data to outside the content generating device; and a content distribution device including at least one processor configured to:

receive the low-bit-rate encoded data and the model data transmitted from the content generating device;

generate the improved data based on the low-bit-rate encoded data, from the low-bit-rate encoded data and the model data received; and distribute the improved data as content data.

7. The content distribution system of claim 6, wherein the at least one processor of the content generating device is further configured to:

store the model data generated in the past; and transmit, to the outside the content generating device, the model data generated in the past together with the low-bit-rate encoded data.

8. The content distribution system of claim 7, wherein the original data includes the category information for classifying content according to characteristics thereof, and the at least one processor of the content generating device records the model data classified based on the category information or an initial value of the model data.

9. The content distribution system of claim 6, wherein the original data is image data, and the low-bit-rate encoded data includes meta-information.

10. The content distribution system of claim 9, wherein the meta-information of the low-bit-rate encoded data is at least one of: a coding block quantization parameter (QP), a prediction error coefficient, prediction mode information, and motion vector information in an image coding technique.

11. A content generating method, comprising:

obtaining original data including category information;

encoding the original data to a low-bito rate and generating low-bit-rate encoded data;

generating, based on a machine-learned model, machine-learned model data corresponding to the category information of the original data by using teacher data corresponding to the category information, the machine-learned model data to be used for generating improved data that is human perceptually improved from the low-bit-rate encoded data; and transmitting the low-bit-rate encoded data and the model data to outside a device.

12. The content generating method of claim 11, further comprising:

receiving the low-bit-rate encoded data and the model data; and generating the improved data based on the low-bit-rate encoded data, from the low-bit-rate encoded data and the model data received.

13. The content generating method of claim 11, further comprising:

storing the model data generated in the past; and transmitting the model data generated in the past together with the low-bit-rate encoded data to the outside the device.

14. The content generating method of claim 13, wherein the original data includes the category information for classifying content according to characteristics thereof, and the method further comprises recording the model data classified based on the category information or an initial value of the model data.

15. The content generating method of claim 11, wherein the original data is image data, and the low-bit-rate encoded data includes meta-information.

16. The content generating method of claim 15, wherein the meta-information of the low-bit-rate encoded data is at least one of: a coding block quantization parameter (QP), a prediction error coefficient, prediction mode information, and motion vector information in an image coding technique.

17. A non-transitory computer-readable medium storing a program that, when executed, causes a computer to execute the content generating method of claim 11.

18. The non-transitory computer-readable medium of claim 17, wherein the method further comprises:

receiving the low-bit-rate encoded data and the model data; and generating the improved data based on the low-bit-rate encoded data, from the low-bit-rate encoded data and the model data received.

19. The non-transitory computer-readable medium of claim 17, wherein the method further comprises:

storing the model data generated in the past; and transmitting the model data generated in the past together with the low-bit-rate encoded data to the outside the device.

20. The non-transitory computer-readable medium of claim 17, wherein
the original data is image data, and
the low-bit-rate encoded data includes meta-information.

* * * * *